United States Patent [19]

Koyama et al.

[11] 4,140,166

[45] Feb. 20, 1979

[54] PNEUMATIC RADIAL TIRE

[75] Inventors: Kazuo Koyama, Sayama; Yukihiko Kamiya, Iruma; Shuichi Watanabe, Hachioji; Yoshiaki Ishikawa, Higashi-Murayama, all of Japan

[73] Assignee: Bridgestone Tire Company Limited, Tokyo, Japan

[21] Appl. No.: 797,142

[22] Filed: May 16, 1977

[30] Foreign Application Priority Data

May 19, 1976 [JP] Japan .................................. 51-56629

[51] Int. Cl.$^2$ .............................................. B60C 9/18
[52] U.S. Cl. ................................ 152/361 R; 152/374; 152/361 DM
[58] Field of Search ..... 152/361 R, 361 DM, 361 FP, 152/360, 354, 357, 374; 428/295

[56] References Cited

U.S. PATENT DOCUMENTS

| | | | |
|---|---|---|---|
| 3,211,819 | 10/1965 | Guyot | 152/357 R |
| 3,773,096 | 11/1973 | Masson | 152/354 |
| 3,902,542 | 9/1975 | Imamura et al. | 152/361 R |
| 3,907,019 | 9/1975 | Montagne | 152/354 |

FOREIGN PATENT DOCUMENTS 1067856  5/1967  United Kingdom ..................... 152/360

Primary Examiner—Francis S. Husar
Assistant Examiner—Lawrence E. Williams
Attorney, Agent, or Firm—Sughrue, Rothwell, Mion, Zinn and Macpeak

[57] ABSTRACT

A pneumatic radial tire has as a reinforcement for a crown a belt consisting of a plurality of laminated plies whose cords intersect to each other. A coating rubber having a higher modulus is applied to the central zone of the belt which would be subjected to the most of the vertical stresses caused by the inner air pressure when the tire is inflated, and a coating rubber having a lower modulus is applied to the edge zones of the belt. The lower modulus coating rubber has a high elongation and a high tensile strength at break which serve to reduce shearing strains at the edges of the belt. Such coating rubbers having different properties are used in central and edge zones of the belt to match the requirement of the strengths of the belt, thereby increasing the service life of the tire.

7 Claims, 4 Drawing Figures

4,140,166

PNEUMATIC RADIAL TIRE

BACKGROUND OF THE INVENTION (1) Field of the Invention

The present invention relates to a pneumatic radial tire superior in its service life.

(2) Description of the Prior Art

Over the years, radial tires have been widely used, each which includes a carcass body consisting of ply cords substantially radially arranged in the tire and employs a belt consisting of a plurality of laminated plies whose cords intersect each other and surround the carcass body as a reinforcement of a crown for the purpose of supporting circumferential components of pneumatic pressure in the tire. The belt of such a tire is generally required to have a high rigidity.

However, as the rigidity of the belt becomes higher, shearing strains between the laminated plies at edges of the belt will be greater which tend to shorten the service life of the tire.

Accordingly, the belt is required to have a high rigidity for supporting stresses resulting from the inner air pressure of the tire, while at the same time it is important at its edges to have a characteristic which reduces the shearing strains between the laminated plies rather than the high rigidity. In other words, the belt is required to have the different properties at the respective central and edge zones of the belt.

The prior art, however, is devoid of a radial tire having this consideration of the belt's rigidity to match the above requirement.

SUMMARY OF THE INVENTION

An object of the invention is, therefore, to provide a pneumatic radial tire including a belt having different properties at the central and edge zones to support the vertical stresses resulting from the inner air pressure of the tire and to prevent the separations at the edges of the belt to thereby elongate the service life of the tire.

The tire according to the invention includes as a reinforcement for a crown a belt consisting of a plurality of laminated plies whose cords intersect to each other, with the belt surrounding a carcass body including ply cords substantially radially arranged, a coating rubber having a 100% modulus of more than 70 kg/cm$^2$ used in a central zone of said belt which is determined by a ratio of $0.85 \leq a/c \leq 0.95$ where a is a width of said central zone and c is an overall width of said belt, and a coating rubber having a 100% modulus of less than 40 kg/cm$^2$ used in remaining both edge zones of said belt.

BRIEF DESCRIPTION OF THE DRAWINGS

These and other objects and advantages of the invention may be readily ascertained by referring to the following description and appended drawings in which.

DESCRIPTION OF THE PREFERRED EMBODIMENTS

Figure 1:
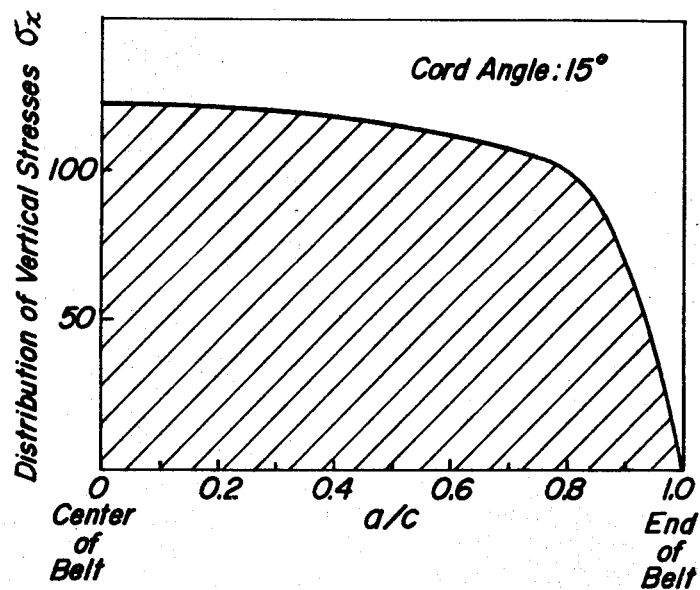
FIG. 1 is a graphical representation showing a distribution of the vertical stresses from the inner air pressure on a belt of a radial tire.

The inventors of the present application made various experiments on tires to investigate the distribution of the vertical stresses when inflated over the widths of the tires. Each of the tires used herein includes a belt consisting of two rubberized cord layers whose cords intersect to each other and are respectively arranged at angles of approximately 15° to a mid circumferential line or an equatorial line of the tire for the purpose of reinforcing its crown. FIG. 1 illustrates an example of the results of the experiments which shows the distribution of the vertical stresses $\sigma_x$ resulting from the inner air pressure when inflated on from the center to the end of the belt in the abscissa which is indicated by the ratio a/c where a is a width of the central zone and c is an overall width of the belt. It is clearly evident from FIG. 1 that the rigidity of the belt in the central zone of the belt of which ratio a/c is 0.85 to 0.95 supports at least 93% of all the vertical stresses.

Figure 2:
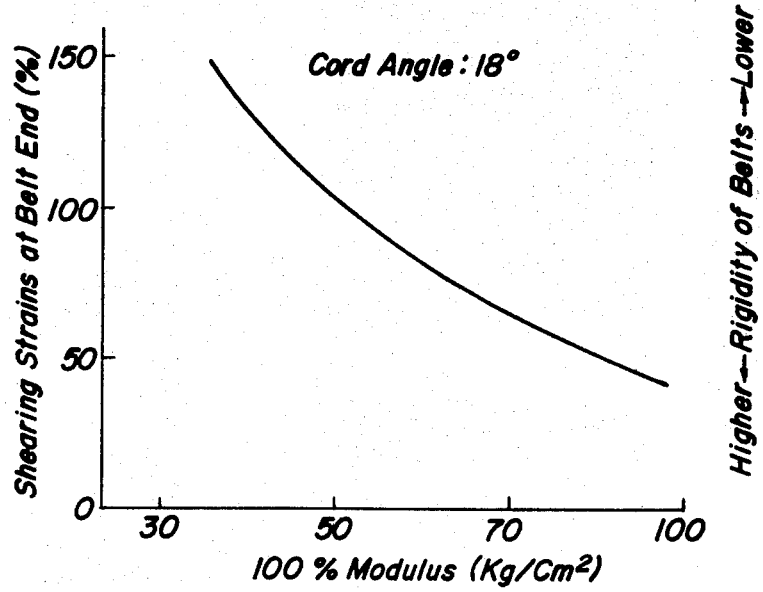
FIG. 2 is a graph illustrating a relation between the shearing strains at the edges of the belt and the 100% modulus of coating rubbers of the belt.

In order to investigate the effect of the physical properties of coating rubber of the belt plies, particularly 100% modulus, on the rigidity of the belt, the inventors made experiments with the shearing strains at the ends of the belts each consisting of two plies whose cords intersect to each other and arranged at angles of approximately 18° to a mid circumferential line or an equatorial line of the tire. As can be seen from the result of the experiments as shown in FIG. 2, the 100% modulus must be more than 70 kg/cm$^2$ to obtain the normally required rigidity of the belts.

Figure 3:
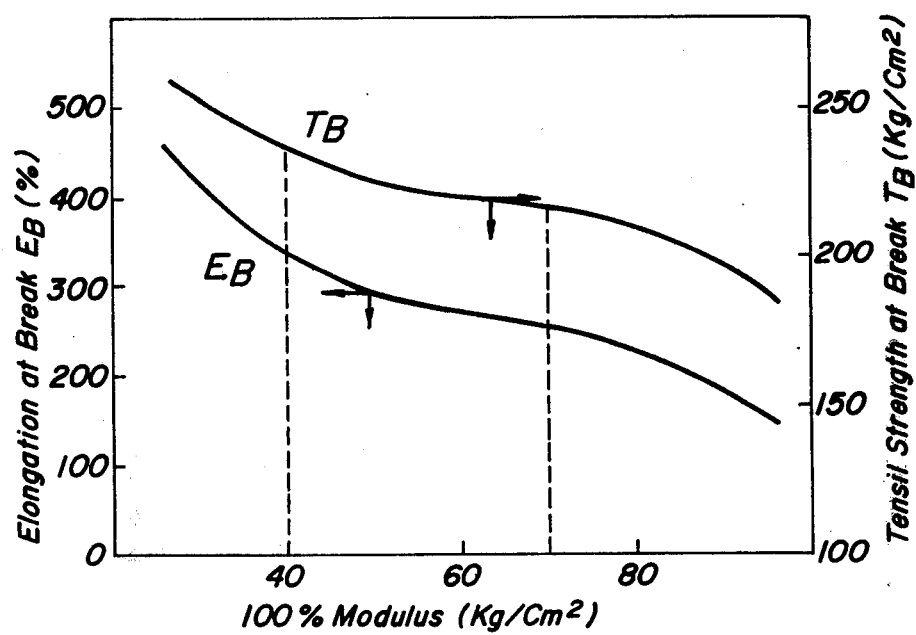
FIG. 3 is a graphical representation illustrating between the 100% modulus of coating rubbers and the elongation and tensile strength at break.

FIG. 3 shows the results of further experiments on the elongation $E_B$ at break and the tensile strength $T_B$ at break in relation of the 100% modulus of the coating rubber. It has been found in the experiments that when the 100% modulus is more than 70 kg/cm$^2$, the elongation and strength $E_B$ and $T_B$ at break decrease rapidly, whereas when the modulus is less than 40 kg/cm$^2$, the elongation $E_B$ and strength $T_B$ are higher.

Figure 4:
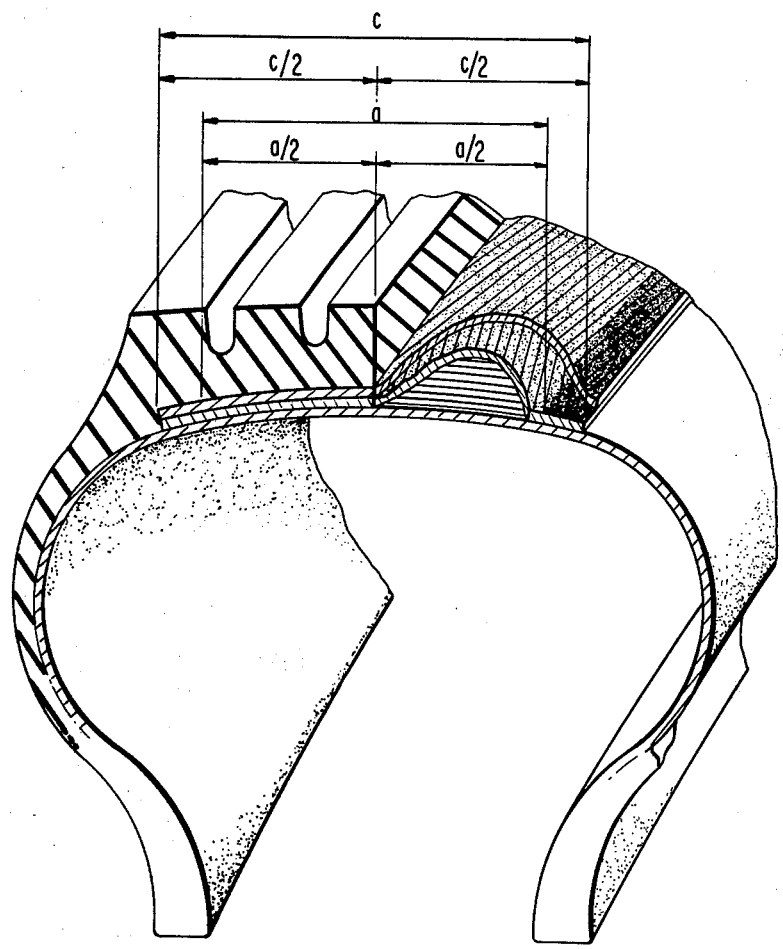
FIG. 4 is a perspective view of a tire section according to the invention in partial cutaway.

In consideration of the above results, the tire according to the invention employs at the central zone of the belt the coating rubber having the 100% modulus of more than 70 kg/cm$^2$ to provide the most of the required rigidity of the belt at the edge zones of the belt the coating rubber has the modulus of less than 40 kg/cm$^2$ and high elongation $E_B$ and tensile strength $T_B$ at break to decrease the shearing strains at the edges of the belt, thereby increasing the service life by the sufficient high rigidity of the belt. The overall construction is shown in the perspective view of FIG. 4, wherein the two different types of stippling indicate the different coating rubbers in the central and edge zones of the breaker plies.

According to the present invention, the coating rubber having the modulus of more than 70 kg/cm$^2$ is applied to the central zone of the belt plies, because coating rubber having the modulus of less than the value does not provide the required rigidity of the belt. The high modulus rubber having a 100% modulus of less than 120 kg/cm$^2$ is preferably used for this purpose.

According to the present invention, the 100% modulus d of the coating rubber to be applied to the edge zones of the belt plies must be less than 40 kg/cm$^2$. If the 100% modulus is higher than this value, the shearing strains at the edges of the belt will not be mitigated. Normally, the rubber having the 100% modulus of 10 to 40 kg/cm² is preferably used for this purpose, which is high resistant to the break.

As described above, the tire according to the present invention employs the different coating rubbers having respective 100% moduluses at the center and edge zones of the belt plies of the tire to improve the rigidity of the belt of the tire without increasing the shearing strains at the edges of the belt.

In effect, the thickness of the coating rubber can be selected within 0.7 to 1.2 mm. In carrying out the present invention, it is normally preferable to arrange the cords of the belts at angles between 10° and 30°.

The following compounding recipe is preferable for the coating rubber at the central zone of the belt of the tire according to the invention.

|  | Parts by weight |
|---|---|
| Natural rubber | 100 |
| Carbon black | 60 |
| Aromatic oil | 2 |
| Adhesives | 2 |
| Age resistor | 1 |
| Zinc white | 7 |
| Vulcanizing accelerator | 0.8 |
| Sulfur | 5 |

The 100% modulus of the rubber of the above compounding recipe is 72 kg/cm², which will be referred to as "rubber A", hereinafter.

Furthermore, the following compounding recipe is preferable for the coating rubber used at the edge zones of the belt of the tire according to the invention.

|  | Parts by weight |
|---|---|
| Natural rubber | 100 |
| Carbon black | 60 |
| Aromatic oil | 5 |
| Adhesives | 2 |
| Age resistor | 1 |
| Zinc white | 7 |
| Vulcanizing accelerator | 0.6 |
| Sulfur | 3 |

The rubber of this compounding ratio has a 100% modulus of 35 kg/cm², which will be referred to as "rubber B", hereinafter.

In order to ascertain the performance of the tires according to the invention, the inventors made tires of 10.00R20 as the first embodiment using belts for the reinforcement of crowns, the belt ply consisting of a central zone defined by the ratio a/c of 0.88 made of the rubber A having 1 mm thickness and the remaining edges of the ply made of the rubber B having also 1 mm thickness. These tires were urged against a test drum rotating at the circumferential speed 65 km/hr to be driven under the loaded condition where the load was stepwise increased from 80% to 200% load according to JIS (the Japanese Industrial Standard) until failure occurred at the edges of the belts. In this case, the durability of a tire corresponds to the travelling distance through which the tire rolled on the drum until the breaks occurred. On the other hand, comparative tires were made whose all the coating rubbers were made of the rubber A and subjected to the same tests. Table 1 indicates the durability of the tires according to the second embodiment of the invention as index numbers when the durability of the comparative tires is represented by 100. Table 1 includes the results of reference tires 1 and 2 wherein rubbers having the intermediate compounding recipe between those of the rubbers A and B. With the reference tire 1, the rubbers having 100% modulus 64 kg/cm² and 43 kg/cm² are used at the central and edge zones, respectively, and the rubbers having 100% modulus 67 kg/cm² and 35 kg/cm² are used at the central and edge zones, respectively, for the reference tire 2.

Table 1

|  | Comparative tires 1 | Reference tires 1 | Reference tires 2 | Tires according to the invention (the first embodiment) |
|---|---|---|---|---|
| 100% modulus of coating rubber at the center of belts (kg/cm²) | 72 | 64 | 67 | 72 |
| 100% modulus of coating rubber at the edges of belts (kg/cm²) | 72 | 43 | 35 | 35 |
| Index number of durability | 100 | 110 | 120 | 130 |

As can be seen from Table 1, the tires according to the invention are superior in durability to the comparative and reference tires having belts made of the coating rubbers whose 100% modulus are not suited for the requirements of the belts.

Furthermore, tires of 1000R20,14PR according to the invention were made as the second embodiment, using coating rubbers A' and B both having 1 mm thickness, the coating rubbers A' having a compounding recipe so as to provide a modulus of 75 kg/cm² slightly higher than that of the rubber A. These tires are equipped onto 8-wheeled trucks for their all wheels. After these trucks had travelled 30,000, 40,000 and 60,000 km on paved roads at a mean speed 80 km/hr under 130% of the load according to JIS, defects occurred at the ends of belts of the tires were measured to estimate the performance of the tires by the degrees of the separations. Table 2 shows index numbers of the durability of the tires according to the second embodiment of the invention in comparison with comparative tires using a single coating rubber at central and edge zones of belts having a 100% modulus of 75 kg/cm² and two kinds of reference tires 3 and 4 having respective different combinations of the coating rubbers.

Table 2

|  | Comparative tires 2 | Reference tires 3 (comparative example) | Reference tires 4 (comparative example) | Tires according to the invention (the second embodiment) |
|---|---|---|---|---|
| 100% modulus of coating rubber at the center of belts (kg/cm²) | 75 | 65 | 62 | 75 |
| 100% modulus of coating rubber at the edges of belts (kg/cm²) | 75 | 43 | 35 | 35 |
| Travelled distance 30,000 km | 100 | 92 | 85 | 190 |
| Travelled distance 40,000 km | 100 | 90 | 73 | 230 |
| Travelled distance | 100 | 90 | 75 | 230 |

Table 2-continued

| | Comparative tires 2 | Reference tires 3 (comparative example) | Reference tires 4 (comparative example) | Tires according to the invention (the second embodiment) |
|---|---|---|---|---|
| 60,000 km | | | | |

It is clearly evident from Table 2 that the tires according to the invention are superior in durability to the comparative and reference tires having belts made of the coating rubbers whose 100% modulus are not suitable for the requirements of the belts, and the superiority in durability of the tires according to the invention over the comparative and reference tires increases as the travelled distances become longer.

It should be noted that the pneumatic radial tires according to the invention is much superior in durability to those of the prior art and very useful in practice.

While preferred embodiments have been described, variations thereto will occur to those skilled in the art within the scope of the present invention concepts which are delineated by the following claims.

What is claimed is:

1. In a pneumatic radial tire including as a reinforcement for a crown, a breaker belt having a plurality of laminated plies each including cords intersecting each other, said belt surrounding a carcass body with ply cords substantially radially arranged, the improvement comprising; a coating rubber having a 100% modulus of more than 70 kg/cm$^2$ used in a central zone of said belt which is determined by a ratio of $0.85 \leq a/c \leq 0.95$ where a is a width of said central zone and c is an overall width of said belt, and a coating rubber having a 100% modulus of less than 40 kg/cm$^2$ used in edge zones of said belt outside said central zone.

2. A pneumatic radial tire as set forth in claim 1, wherein said 100% modulus of said coating rubber used in the central zone of said belt is 70 to 120 kg/cm$^2$.

3. A pneumatic radial tire as set forth in claim 1, wherein said 100% modulus of said coating rubber used in the both edge zones is 10 to 40 kg/cm$^2$.

4. A pneumatic radial tire as set forth in claim 1, wherein said ratio a/c is 0.88.

5. A pneumatic radial tire as set forth in claim 1, wherein said cords of said belt are arranged at angles of 10° to 30° to a mid circumferential line of said tire and thicknesses of said coating rubbers are 0.7 to 1.2 mm.

6. A pneumatic radial tire as set forth in claim 1, wherein said ratio a/c is 0.88, said 100% modulus of the coating rubber used in the central zone of said belt is 72 kg/cm$^2$ and said 100% modulus of the coating rubber used in the both edge zones is 35 kg/cm$^2$.

7. A pneumatic radial tire as set forth in claim 1, wherein said ratio a/c is 0.88, said 100% modulus of the coating rubber used in the central zone of said belt is 75 kg/cm$^2$ and said 100% modulus of the coating rubber used in the both edge zones is 35 kg/cm$^2$.

* * * * *